United States Patent [19]

Carpenter et al.

[11] Patent Number: 4,642,502

[45] Date of Patent: Feb. 10, 1987

[54] DYNAMOELECTRIC MACHINE WITH PERMANENT MAGNET AND MAGNET MOUNTING SURFACE ARRANGEMENT

[75] Inventors: Keith H. Carpenter, Kettering; Jon E. Miller, Spring Valley; John W. Murphy, Kettering, all of Ohio

[73] Assignee: General Motors Corporation, Detroit, Mich.

[21] Appl. No.: 855,344

[22] Filed: Apr. 24, 1986

[51] Int. Cl.$^4$ .............................................. H02K 1/18
[52] U.S. Cl. ................................... 310/156; 310/216; 310/254
[58] Field of Search ................. 310/42, 154, 156, 216, 310/217, 218, 254, 261

[56] References Cited

U.S. PATENT DOCUMENTS

| | | | |
|---|---|---|---|
| 2,435,911 | 2/1948 | van der Woude | 310/216 |
| 3,234,416 | 2/1966 | Weitbrecht | 310/153 |
| 3,713,015 | 1/1973 | Frister | 310/156 |
| 4,443,776 | 4/1984 | Cunningham | 310/268 |
| 4,535,263 | 8/1985 | Avery | 310/156 |

OTHER PUBLICATIONS

Slemon et al, "Electric Machines", Addison-Wesley, 1980, p. 357.

Primary Examiner—Patrick R. Salce
Assistant Examiner—D. L. Rebsch
Attorney, Agent, or Firm—Robert M. Sigler

[57] ABSTRACT

A dynamoelectric machine has a rotor or stator which comprises a core with axial groups of flat, rectangular magnet mounting surfaces, each successive magnet mounting surface of a group being circumferentially offset by a common angle of axial rotation from the previous magnet mounting surface. A magnet is mounted on each magnet mounting surface; and each magnet has a flat surface for mounting and an opposing arcuate surface to help form a cylindrical surface. Each of the magnets has the shape, when viewed radially, of a parallelogram forming a skew angle with the axis corresponding with the rotational offset of the magnet mounting surfaces to define skewed slots between skewed magnetic poles extending the substantial axial length of the core. The core may comprise polygonal lamina with the flat polygon sides grouped to form the magnet mounting surfaces; or it may comprise circular lamina with a non-magnetic sleeve having the magnet mounting surfaces. The latter provides a larger but more even air gap.

5 Claims, 5 Drawing Figures

DYNAMOELECTRIC MACHINE WITH PERMANENT MAGNET AND MAGNET MOUNTING SURFACE ARRANGEMENT

BACKGROUND OF THE INVENTION

This invention relates to dynamoelectric machines, and particularly to such machines having one of the rotor and stator including electromagnetic wound poles and the other of the rotor and stator including permanent magnets on a magnetic core. The sintered magnets used in such machines are generally arcuate in shape and attached to a cylindrical core with adhesive. However, due to the distortions occurring in the sintering of a relatively thin part, magnets must have their arcuate surfaces finished by a grinding process; and this grinding process itself leaves a surface which is not truly arcuate, but includes high and low points. Likewise, the part of the core to which the magnet is attached may have been formed from a die which was ground and includes similar high and low points. Thus the parts do not meet precisely over the full mounting surface; and the adhesive is thus squeezed out of the areas of high points for a non-uniform attachment. In addition, the varying gap creates non-uniform magnetic flux across the boundary.

A solution to this problem of non-uniform arcuate surfaces in permanent magnets used in dynamoelectric machines must, however, also take into account the axial skew in the magnetic poles, which skew is introduced to reduce magnetic flux variations and resulting audible noise created during rotor rotation.

SUMMARY OF THE INVENTION

An inventive dynamoelectric machine which overcomes the difficulties of the prior art comprises a rotor and a stator, one of which comprises a plurality of wound electromagnetic poles and the other of which comprises a laminated core of a magnetic material and including means defining a cylindrical surface comprising a plurality of flat, rectangular, magnet mounting surfaces, the magnet mounting surfaces being grouped in axial groups with each successive magnet mounting surface of each axial group, proceeding from one axial end of the core, circumferentially offset by a common angle of rotation about the axis from the previous magnet mounting surface of the axial group. The machine further comprises a plurality of identically shaped permanent magnets mounted one on each of the magnet mounting surfaces, the magnets having flat surfaces adjacent the magnet mounting surfaces and arcuate surfaces opposite the flat surfaces, the arcuate surfaces of the magnets together forming a generally cylindrical surface adjacent the wound electromagnetic poles, each of the magnets further having the shape, when viewed radially, of a parallelogram forming a skew angle with the axis corresponding with the rotational offset of the magnet mounting surfaces to define skewed slots between skewed magnetic poles extending the substantial axial length of the core.

The magnets are thus attached to the core with flat surfaces which provide for a more even application of adhesive and a less variable magnetic flux variation. In one embodiment, the magnet mounting surfaces are formed by the lamina themselves, grouped axially with a circumferential offset for each successive group proceeding axially. In another embodiment, the lamina form a cylindrical core adjacent a sleeve of non-magnetic material such as stainless steel or a thermoplastic resin with the magnet mounting surfaces formed on the sleeve. The second embodiment defines a larger but more uniform air gap as the rotor rotates. In any case, the core, magnets and sleeve, if present, may be on the rotor or the stator of the machine. Further details and advantages of the invention will be apparent from the accompanying drawings and following description of a preferred embodiment.

DESCRIPTION OF THE PREFERRED EMBODIMENT

Figure 1:
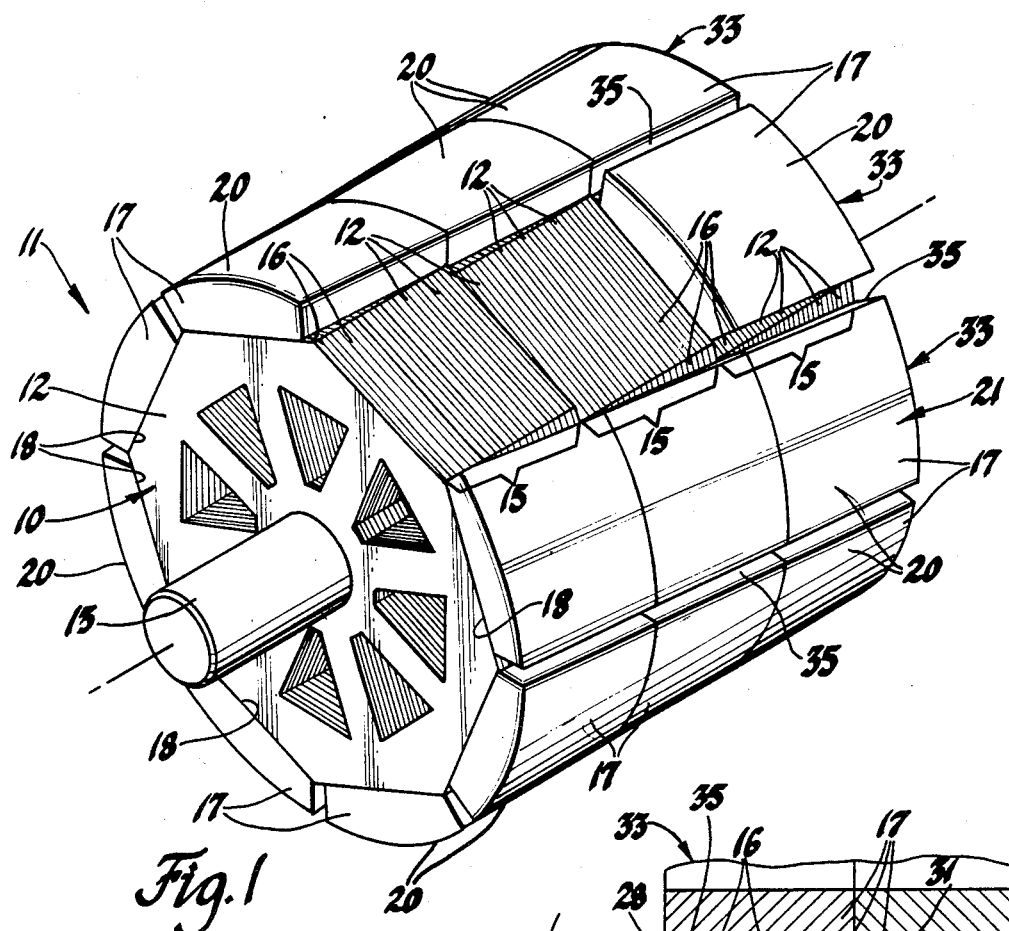
FIG. 1 is a perspective view of a permanent magnet rotor embodiment of a dynamoelectric machine according to this invention with several magnets removed to show the underlying core structure.

The specific embodiments shown are permanent magnet rotor machines, in which the rotor includes the permanent magnet poles and the stator the wound electromagnetic poles. Many motors of this type, including most brushless motors, exist in the prior art. Referring to FIG. 1, a core 10 of rotor 11 comprises a plurality of lamina 12 of a magnetic material such as steel axially stacked with a shaft 13. Each of lamina 12 has an identical shape with a polygonal outer circumference. Lamina 12 are grouped in groups 15 so that the outer circumferential sides of the lamina form flat, rectangular magnet mounting surfaces 16. Each group 15 of lamina 12, however, starting at one axial end of rotor 11, is rotated slightly by a common angle so that each successive magnet mounting surface, proceeding from one axial end of the rotor, is rotationally offset from the preceding magnet mounting surface by the common rotational angle.

Figure 2:
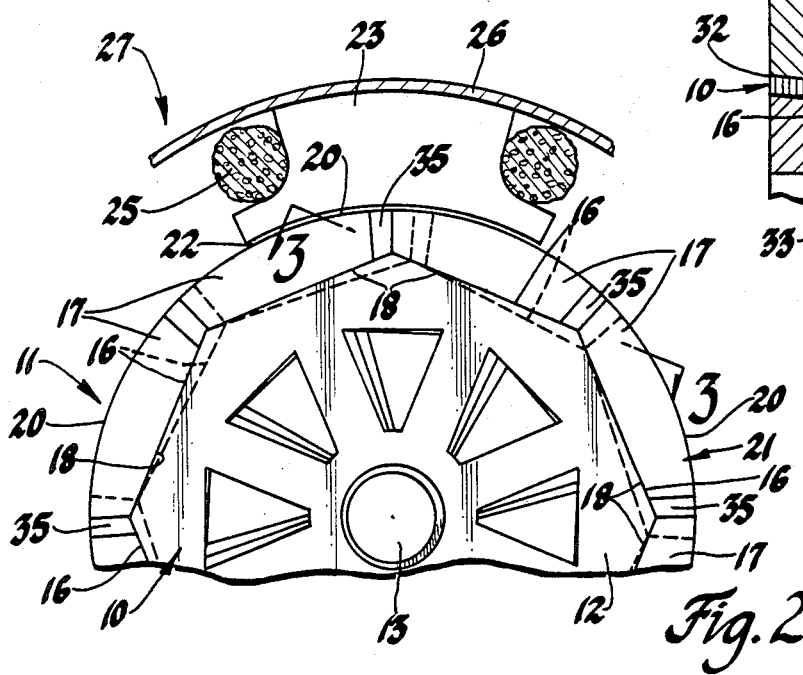
FIG. 2 is an end view of a portion of the machine of FIG. 1 including a portion of the stationary structure.

Each magnet mounting surface has mounted thereon a permanent magnet 17, although several have been removed from the rotor of FIG. 1 for better visibility of the structure of core 10. Each magnet 17 has a flat surface 18 for mounting on magnet mounting surface 16. The flat surfaces are more easily formed by normal manufacturing techniques without the high and low spots of the arcuate surfaces of the prior art. The opposite surface 20 of each magnet is arcuate but is not mounted on any other surface, so that the high and low points do not matter. Surfaces 20 of magnets 17 form an overall cylindrical outer surface 21 for rotor 11 adjacent stationary pole 23 having a winding 25 and mounted in case 26 in the usual manner, as seen in FIG. 2. The stationary structure of the dynamoelectric machine 27 which includes pole 23, winding 25, case 26 and rotor 11 is standard, well known in the art and not critical to the invention.

Figure 3:
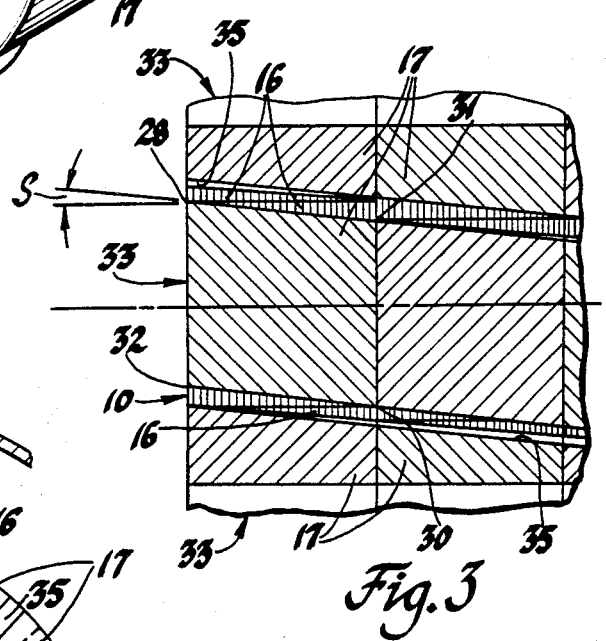
FIG. 3 is a section view through several magnets above the core in the rotor of FIG. 1.

In order to form skewed magnetic poles on rotor 11, the rotational offset of the groups 15 of lamina 12 is combined with an identical parallelogram shape for each of the magnets 17, the parallelogram forming an angle with the axis of the rotor corresponding to the rotational offset angle of the magnet mounting surfaces so that the skew angle of the magnets follows the offset of the magnet mounting surfaces from one axial end of the rotor to the other. Referring to FIG. 3, it can be seen that, although a magnet mounting surface 16 is rectangular, magnet 17 thereon forms a parallelogram having a pair of opposite corners 28 and 30 which meet the corresponding corners of magnet mounting surface 16 and another pair of corners 31 and 32 which do not meet the corresponding corners of the magnet mounting surface 16. The axial length of magnet 17 is equal to that of magnet mounting surface 16, so that axially adjacent magnets 17 are in axial contact. However, the circumferential length of magnets 17 is shorter than that of magnet mounting surfaces 16. The circumferential sides of magnets 17 thus form a skew angle S with the axis of rotor 11; and corners 31 and 32 meet the axial ends of the magnet mounting surface at points where, if there is an adjacent magnet, a corner of that magnet meets a corner of its own magnet mounting surface. The corners of the magnets thus meet to form axially extending skewed poles 33 separated by skewed slots 35, with the skew angle of the magnetic poles and slots corresponding to the rotational offset of the magnet mounting surfaces.

Figure 4:
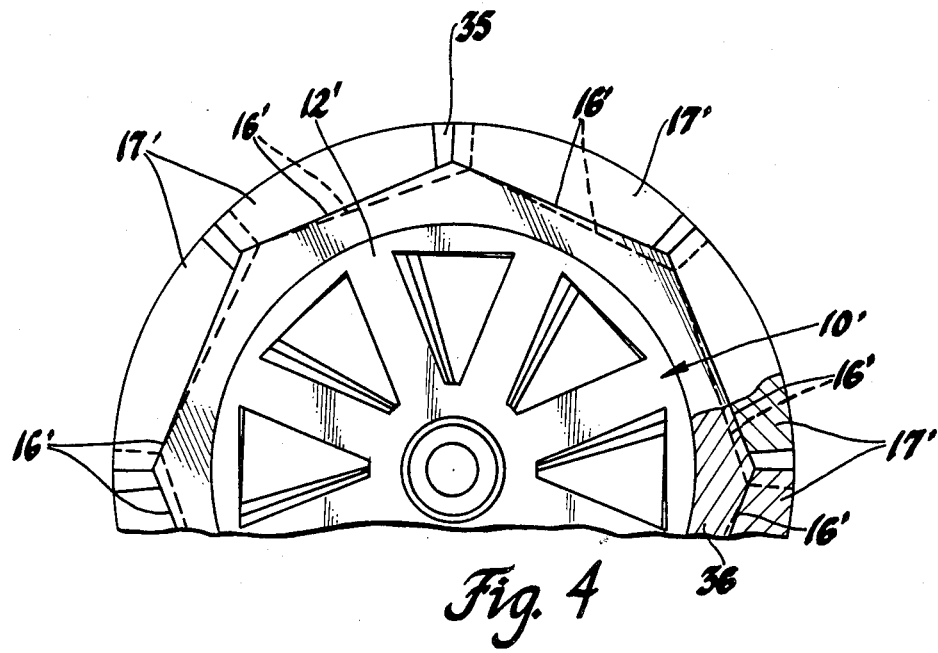
FIGS. 4 and 5 are end views of alternate embodiments of the machine of FIG. 1 including sleeves of differing non-magnetic materials.
Figure 5:
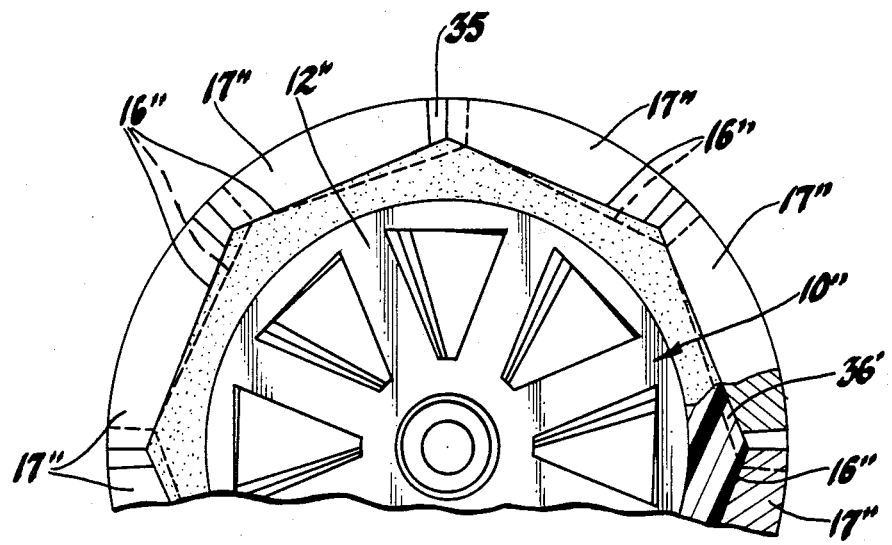

The introduction of the flat magnet mounting surfaces 16 in the magnetically responsive portion of core 10, however, creates a fluctuating air gap width as rotor 11 rotates, since the magnets 17 are seen as part of "air gap" 22 in the magnetic circuit. If this is a problem, a modification of the embodiment of FIGS. 1-3 is appropriate. Two versions of the modification are shown in FIGS. 4 and 5. Referring to FIG. 4, the lamina 12' of core 10' have a circular outer circumference. Mounted thereon is a sleeve 36 made of a non-magnetic metal such as stainless steel and having an outer surface defining magnet mounting surfaces 16' for magnets 17' which are similar in shape, size and arrangement to the surfaces 16 shown in FIGS. 1-3. The sleeve could be a single part but, in the case of stainless steel, would much more likely comprise a plurality of such sleeves axially stacked, each sleeve being axially as long as the axial length of a surface 16'.

The embodiment of FIG. 5, is similar, including lamina 12" of core 10", magnet mounting surfaces 16", magnets 17" and a sleeve 36' made of a thermoplastic resin or similar non-magnetic, non-metallic material. In the case of a rotor, the thermoplastic sleeve would have a smaller moment of inertia than a similarly shaped sleeve of stainless steel. Sleeve 36' might be more easily formed as a single unit, although it could also be made of several axially shorter sleeves axially stacked similarly to sleeve 36. Each of the rotors shown in FIGS. 4 and 5 eliminate the air gap fluctuations with rotor rotation which were introduced in the embodiment of FIGS. 1-3 with the flat outer surfaces of the magnetic portion of core 10. The price to be paid is a larger air gap, since the sleeve is added radially between the magnetic lamina and stationary poles. However, the loss of flux is not fatal to the embodiment since there are now much stronger permanent magnet materials available, such as Neodimium-Boron-Iron and other rare earth magnet materials, which are quite capable of saturating the iron core even with the wider air gap.

It should be noted that, in view of this disclosure, the principles and teachings thereof could also be easily applied in an analogous manner by those skilled in the art to stationary magnets in wound rotor dynamoelectric machines. For example, the inner surface of the case, or an inserted sleeve of magnetic or non-magnetic material, could be formed with inner flat, magnet mounting surfaces similar to surfaces 16 in size, shape and arrangement, with stationary magnets mounted thereon.

It should also be noted that the magnets 17 produce the additional advantage of less breakage during assembly and other factory handling, since their flat mounting surfaces distribute stress better and thus make them stronger than the more conventional arcuate magnets.

The embodiments of the invention in whioh an exclusive property or privilege is claimed are defined as follows:

1. A dynamoelectric machine having a rotor and a stator, one of the rotor and stator comprising a plurality of wound electromagnetic poles, the other of the rotor and stator comprising, in combination:

a core at least a portion of which is laminated of a magnetic material, the core having an axis and a plurality of flat, rectangular magnet mounting surfaces parallel to the axis, the magnet mounting surfaces being grouped in axial groups with each successive magnet mounting surface of each axial group, proceeding from one axial end of the core, circumferentially offset by a common angle of rotation about the axis from the previous magnet mounting surface of the axial group; and a plurality of identically shaped permanent magnets mounted one on each of the magnet mounting surfaces, the magnets having flat surfaces adjacent the magnet mounting surfaces and arcuate surfaces opposite the flat surfaces, the arcuate surfaces of the magnets together forming a generally cylindrical surface adjacent the wound electromagnetic poles, each of the magnets further having the shape, when viewed radially, of a parallelogram forming a skew angle with the axis corresponding with the rotational offset of the magnet mounting surfaces to define skewed slots between skewed magnetic poles extending the substantial axial length of the core.

2. A dynamoelectric machine having a rotor and a stator, one of the rotor and stator comprising a plurality of wound electromagnetic poles, the other of the rotor and stator comprising, in combination:

a core comprising a plurality of substantially identical lamina of a magnetic material each having a polygonal circumference, the lamina being axially stacked in groups with the lamina of each group forming flat, rectangular, magnet mounting surfaces, each group of lamina, proceeding from one axial end of the core, being rotationally offset about the common axis by a common angle of rotation from the previous group of lamina; and a plurality of identically shaped permanent magnets mounted one on each of the magnet mounting surfaces, the magnets having flat surfaces adjacent the magnet mounting surfaces and arcuate surfaces opposite the flat surfaces, the arcuate surfaces forming a generally cylindrical surface adjacent the wound electromagnetic poles, each of the magnets further having the shape, when viewed radially, of a parallelogram forming a skew angle with the axis corresponding with the rotational offset of the magnet mounting surfaces to define skewed slots between skewed magnetic poles extending the substantial axial length of the core.

3. A dynamoelectric machine having a rotor and a stator, one of the rotor and stator comprising a plurality of wound electromagnetic poles, the other of the rotor and stator comprising, in combination:

a core comprising a plurality of substantially identical lamina of a magnetic material, the lamina having a circular circumference and being axially stacked to form a cylindrical surface;

a sleeve made of a non-magnetic material and having a cylindrical surface adjacent the cylindrical surface of the core, the sleeve having an opposing surface comprising a plurality of flat, rectangular, magnet mounting surfaces, the magnet mounting surfaces being grouped in axial groups with each successive magnet mounting surface of each axial group, proceeding from one axial end of the core, rotationally offset about the common axis by a common angle from the previous magnet mounting surface of the axial group; and a plurality of identically shaped permanent magnets mounted one on each of the magnet mounting surfaces, the magnets having flat surfaces adjacent the magnet mounting surfaces and arcuate surfaces opposite the flat surfaces, the arcuate surfaces forming a generally cylindrical surface adjacent the stationary poles, each of the magnets further having the shape, when viewed radially, of a parallelogram forming a skew angle with the axis corresponding with the rotational offset of the magnet mounting surfaces to define skewed slots between skewed magnetic poles extending the substantial axial length of the core.

4. A dynamoelectric machine according to claim 3 in which the non-magnetic material of the sleeve is a metallic material such as stainless steel.

5. A dynamoelectric machine according to claim 3 in which the non-magnetic material of the sleeve is a thermoplastic resin.

* * * * *